C. H. PALMER & J. W. DENMEAD.
BOX MAKING MACHINE.
APPLICATION FILED JAN. 30, 1900.
985,832.
Patented Mar. 7, 1911.
4 SHEETS—SHEET 1.
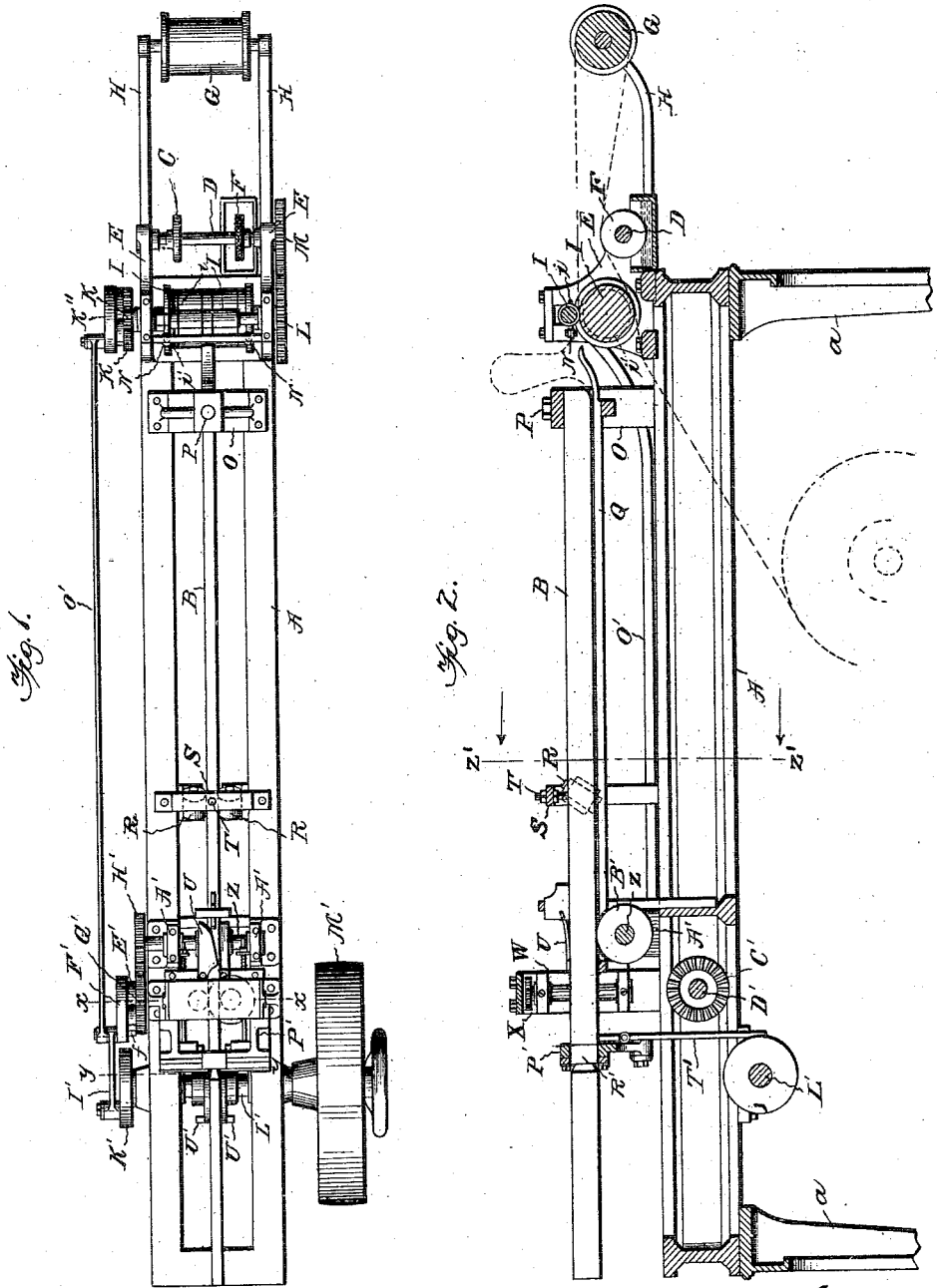

C. H. PALMER & J. W. DENMEAD.
BOX MAKING MACHINE.
APPLICATION FILED JAN. 30, 1900.
985,832.
Patented Mar. 7, 1911.
4 SHEETS—SHEET 2.
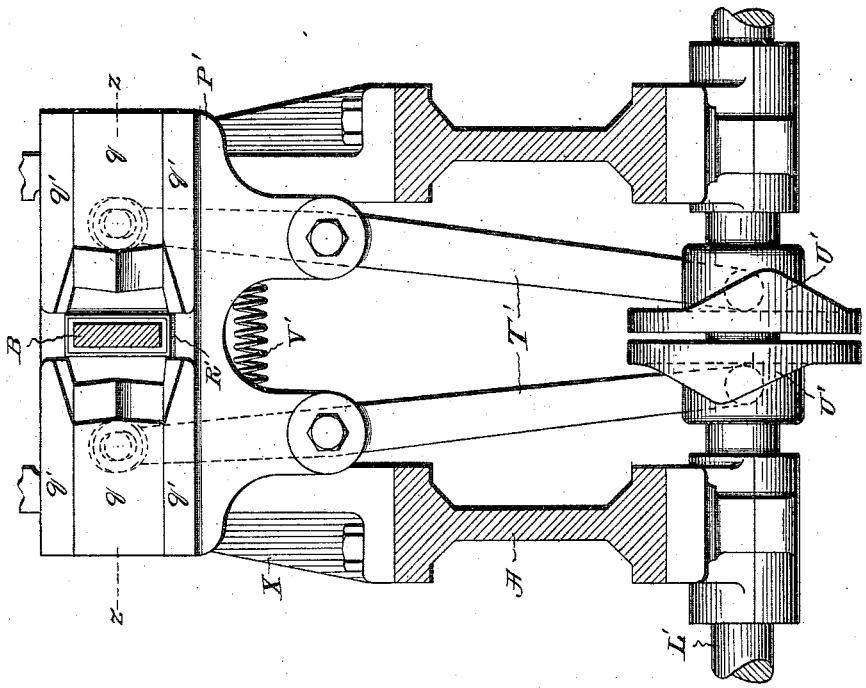
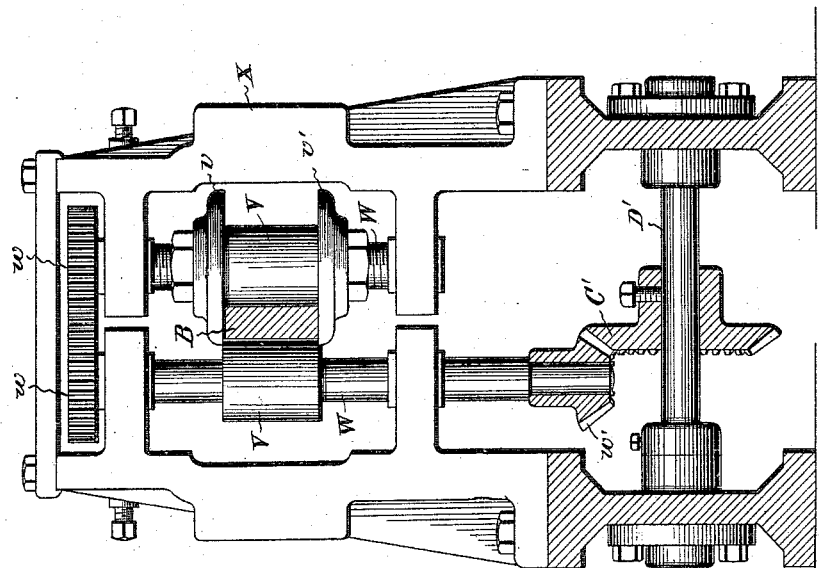

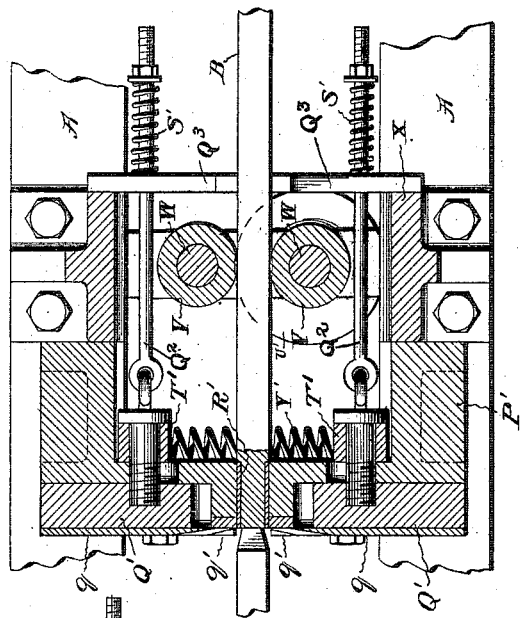
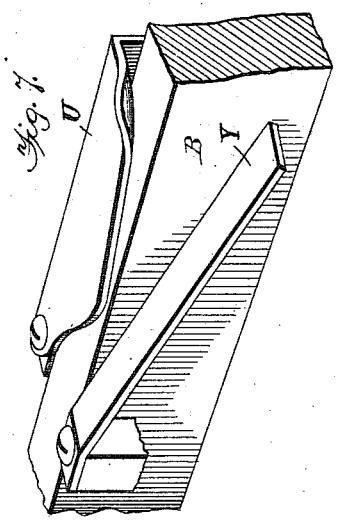
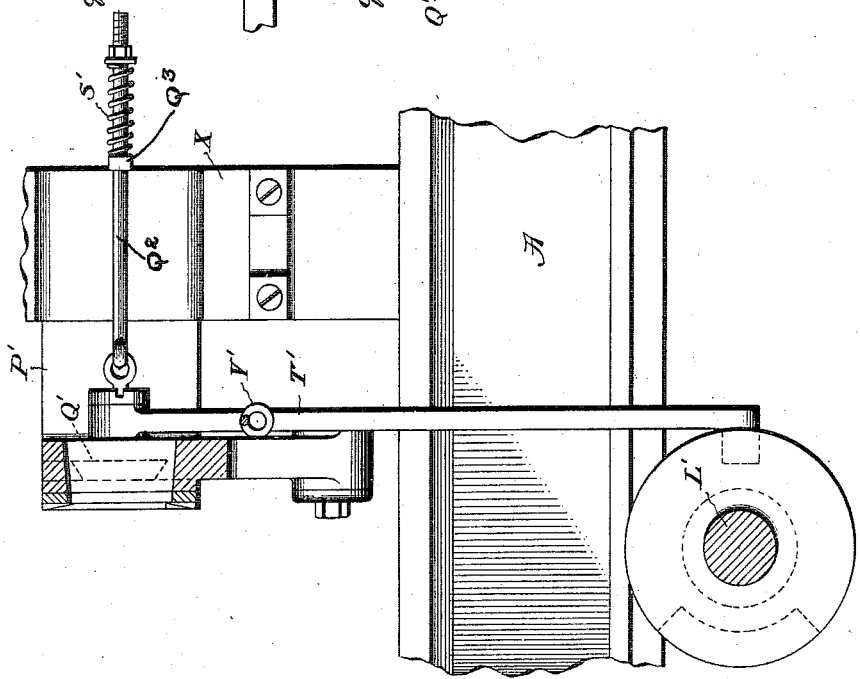

C. H. PALMER & J. W. DENMEAD.
BOX MAKING MACHINE.
APPLICATION FILED JAN. 30, 1900.
985,832.
Patented Mar. 7, 1911.
4 SHEETS—SHEET 4.
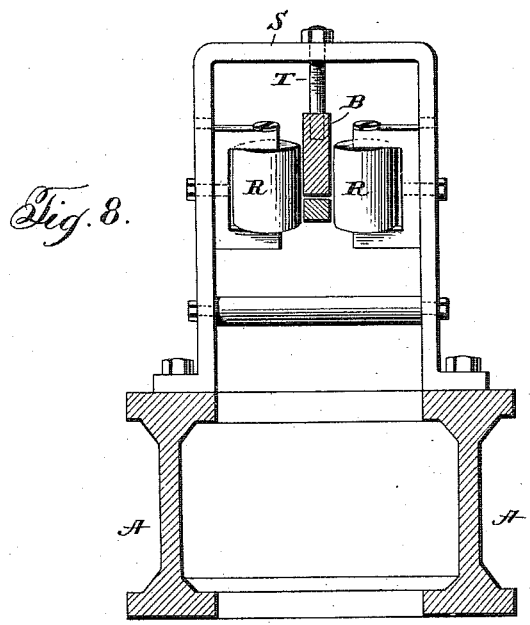
Fig. 8.
Fig. 9.
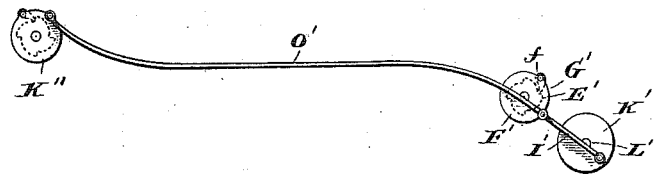
Witnesses:
Jas. E. Hutchinson
F. R. Fitton
Charles H. Palmer  Inventors
John W. Denmead
by John R. Nolan
Attorney

UNITED STATES PATENT OFFICE.

CHARLES HENRY PALMER AND JOHN WILLIAM DENMEAD, OF AKRON, OHIO, ASSIGNORS TO THE DIAMOND MATCH COMPANY, OF NEW YORK, N. Y., A CORPORATION OF ILLINOIS.

BOX-MAKING MACHINE.

985,832.  Specification of Letters Patent.  Patented Mar. 7, 1911.

Application filed January 30, 1900. Serial No. 3,359.

*To all whom it may concern:*

Be it known that we, CHARLES H. PALMER and JOHN W. DENMEAD, of Akron, in the county of Summit, and in the State of Ohio, have invented certain new and useful Improvements in Box-Making Machines, and do hereby declare that the following is a full, clear, and exact description thereof, reference being had to the accompanying drawings, in which—

Figure 1 is a top plan view of a machine embodying our invention, for making box shucks or slides. Fig. 2 a vertical longitudinal section; Fig. 3 a vertical cross section on the line $x$—$x$, Fig. 1; Fig. 4 a vertical cross section on the line $y$—$y$, Fig. 1; Fig. 5 is a vertical longitudinal section illustrating the mechanism shown in Fig. 4. Fig. 6 a horizontal section on the line $z$—$z$, Fig. 4. Fig 7 is a detail view of the stationary folding plate. Fig. 8 is a transverse sectional view on the line $z'$—$z'$, Fig. 2. Fig. 9 is a skeletonized elevation illustrating the feed mechanism.

Letters of like name and kind refer to like parts in each of the figures.

The object of our invention is to provide a machine for making shucks or slides for match and other boxes capable of rapid work and the making of a perfect product, and to this end, said invention consists in the machine having the features of construction substantially as hereinafter specified and claimed.

Our invention belongs to the type of box making machines in which is employed stock that is fed to the machine in the form of a continuous strip of paper which is thereby folded into a tube, and cut into desired lengths, and, in the embodiment of our invention which we have chosen for illustration, we provide a frame or bed A, supported by legs $a$ and $a$, above and parallel with which frame is supported a long, horizontal bar B that constitutes a mandrel or former upon and about which the strip of paper is folded to form a tube of a form agreeing in cross section with the cross section of the mandrel.

The paper strip is taken from a roll, conveniently placed, being passed first over a glue-applying device to receive along one edge of the strip, the adhesive required to join the two edges when overlapped, said device comprising a narrow-faced wheel F that takes liquid glue from a suitable pot, and mounted on a shaft D journaled in bearings in plates E and E bolted to the frame A. Upon the shaft D is a second wheel C placed to engage and support the strip of stock at or near its opposite edge. The strip is next passed to and around a roller G supported by a pair of arms or bars H and H that are attached to and project from the end of the frame A, the strip being thereby reversed, so as to bring its surface with the glue, uppermost, and from thence it passes between a pair of feeding and scoring rolls I and I, placed one above the other, in bearings in the plates E and E, and being respectively provided with circumferential grooves and ribs for scoring the strip at the points where it is to bend in being folded. Power is applied to the lower scoring and feeding roll I by the means hereinafter described, the two rolls being geared together by gear wheels K and K, and, preferably, the glue wheel is driven from the lower roll I by means of a gear wheel L on the latter that meshes with a gear wheel M on the glue wheel shaft D. The strip is held from displacement in a sidewise direction by means of small rollers N and N supported by a bar in advance of the rolls I and I. Projecting from the upper roll I nearest the side of the strip not supplied with glue, is a radial pin or stud $i$ and in line therewith, in the under roll I, is an annular groove $i'$. The function of the pin $i$ is to assist in registering the paper from which the boxes are made, the paper being previously printed and perforated along one edge at proper points and intervals, said pin entering the perforations in the paper and thus imparting to the paper a uniform movement as it feeds through the machine. This prevents the paper either gaining or losing, and preserves an accurate register so that the proper printed matter will appear on each completed box.

From the rolls I and I, the strip is passed beneath the mandrel B, an end of which is supported a short distance from the rolls, by means of a bracket O bolted to the frame A, that arches over the mandrel, a bolt P being passed through the bracket into the top of the mandrel. A bar Q bridges the space between the rolls and the end of the mandrel to support the strip, and it is prolonged beneath and parallel with the mandrel to support the strip and prevent it sagging. Preferably, the portion of strip between the rolls I and I and the end of the mandrel, is formed into a bight or loop. The purpose of forming this bight or loop in the strip is to enable the glue to set, this being obvious from the fact that the bight or loop provides a point, in the travel of the paper strip through the machine, where the moist glue will be exposed for a short time to the air, thereby permitting the same to set, as stated. The bight or loop also assists in the feeding of the strip by the feeding rolls, the strip being thereby freed from longitudinal tension, and consequently each pair of feeding rolls will act upon the strip without affecting the other pair.

At a point about mid-length of the mandrel, on each side thereof, is a roller R which is supported by an arch-form bracket S bolted to the frame A, the roller axis being inclined so that its upper end is toward the receiving end of the mandrel and its lower end toward the box-delivering end thereof. The paper strip, being partially folded up toward the sides of the mandrel, is passed between the latter and said rollers and thus pressed against the sides of the mandrel, and by reason of the described inclination of the rollers is subjected to a lifting action that tightly draws the strip to make it conform to the bottom and sides of the mandrel. To resist the upward strain to which the mandrel is thus subjected, there is a bolt or screw T passed through the top of the arch S, which bears at its lower end against the top of the mandrel.

At a point beyond the rollers R and R, above the mandrel, is fixed a folder plate U of such shape that it will engage and fold down upon the mandrel top the unglued edge of the strip, the other glued edge being next engaged and folded down upon the former by a horizontal flange $v$ on the upper end of one of two rolls V and V placed, respectively, on opposite sides of the mandrel, being fixed upon vertical shafts W and W, journaled in boxes in a frame X bolted to the frame A and arching the mandrel. The flange $v$ of the roller V is of such diameter that it reaches across the top of the mandrel, and acts to iron or firmly press the two lapped edges of the strip together, while the sides thereof are pressed by the two rolls V and V and the bottom is pressed by a flange $v'$ on the lower end of the roll which has the flange $v$, so that after passing the rolls, the strip is transformed into a closed-sided tube that accurately conforms to the cross section of the mandrel, and is ready to be cut into lengths to form perfect shucks ready for immediate use. The sides of the strip are kept close to the mandrel against any outward tendency caused by the pressure applied to the two edges, by means of a strip or finger Y projecting alongside of the mandrel, and fastened to and supported by the frame X. The folder plate U is also attached to and supported by the frame X.

Beneath the mandrel, on a shaft Z journaled in bearings in brackets A' and A' on the frame A, is a feed wheel B' which projects through a slot in the paper supporting bar Q so that its periphery can engage the paper on the underside of the mandrel with sufficient friction to feed it along. The means for driving the feed wheel shaft will be presently described. The mandrel is also supported against upward pressure at this point by the device S previously mentioned.

The two roll shafts W and W, are geared together by intermeshing wheels $w$ and $w$ on the upper ends thereof, and on the lower end of one of said shafts is a bevel pinion $w'$ meshing with a bevel gear wheel C' upon a shaft D' journaled in bearings in the frame A. Upon one end of said shaft D' is fixed a ratchet wheel E' with which a pawl $f$ on a disk F', loose on the shaft D', coöperates to impart to the rolls V and V an intermittent motion. Power is taken from the shaft D' to drive the feed wheel shaft Z by means of intermeshing wheels G' and H' on the respective shafts.

The pawl-carrying disk F' is oscillated by being connected by a pitman I' with a crank disk K' upon a shaft L' mounted in bearings in the frame A, and provided with a driving pulley M'.

For driving the feeding and scoring rolls I and I and the glue wheel in unison with the rolls V and V and the feed wheel B', there is provided on the shaft of the lower roll I a pawl and ratchet mechanism similar to that on the shaft D', the pawl-carrying disk K'' of which is connected to the disk F' by means of a rod or bar, O'.

Bolted to the side of the roll-supporting frame X is a bracket P' having an opening through which the mandrel extends, and having on each side of the latter, a horizontal guideway in which is mounted a slide Q' to the outer face of which is attached a knife comprising a vertical blade $q$ and upper and lower horizontal blades $q'$ and $q'$ which project beyond the vertical blade. Each knife is adapted to cut one side and at least half the top and bottom of the paper tube on the mandrel, and for proper coöperation with the knives, the mandrel is recessed or cut away on each side to permit the knives to pass through the tube walls. The edge of the recess past which the knives move is parallel with the plane of movement of the knives, and the mandrel adjacent to such edge is covered with a hardened shell R' that can be replaced when necessary because of wear. Connected to the center of each knife-carrying slide Q' is a longitudinally-extending tension rod Q², which rods pass through a transverse guide bar Q³ arranged at the rear side of the bracket X, the free ends of said rods being encircled by coiled springs S' which bear against said guide bar and exert their tension to normally draw the rods Q² rearwardly. Thus said rods draw and hold the knife-carrying slides Q' against the back of the knife guide, which action automatically takes up wear and maintains the knife in position for always performing clean, accurate work.

The knife-carrying slides Q' and Q' are reciprocated by levers T' and T' pivoted to the bracket P', whose upper ends are respectively connected to the slides, a cam U' on the shaft L' acting on each lever to move it in one direction and a spring V' moving it in the opposite direction. The two cams U' and U' are so timed that, in cutting, one knife is moved slightly in advance of the other, so that neither will interfere with the other. The shuck, which is formed by being cut from the tube, is passed along and off the mandrel ready for immediate use, if it is not to be used for match boxes that require to be sanded.

It will be understood that in the beginning of the operation of the machine, the paper is placed on the mandrel by hand, but thereafter, the work of forming the tube and cutting it into shuck lengths is carried on automatically.

Having thus described our invention what we claim is:—

1. In a box machine, the combination of a stationary mandrel, means for feeding a strip of paper therealong, means for folding the strip of paper around three sides of the mandrel, a device in rear of the said folding means for lapping over upon the mandrel one edge of the strip, a roll in rear of said device provided with a peripheral portion for lapping over the other edge of the strip, and means for driving said roll.

2. In a box machine, the combination of a stationary mandrel, means for folding a strip of paper around three sides of the same, a device in rear of said folding means for lapping over upon the mandrel one edge of the strip, a feed wheel below the mandrel, a roll in rear of said device provided with a peripheral portion for lapping over the other edge of the strip, and means for concurrently driving said feed wheel and roll.

3. In a box machine, the combination of a stationary mandrel, means for folding a strip of paper around three sides of the same, means for lapping over upon the mandrel one edge of the strip, a feed wheel below the mandrel, a pair of pressing rolls on opposite sides of the mandrel one of which has flanges above and below the mandrel, and means for concurrently driving said feed wheel and pressing rolls.

4. In a box machine, the combination of a stationary mandrel, a scoring means, means for folding a strip of paper around three sides of the mandrel, a feed wheel below the mandrel, a device overhanging and coöperating with the top of the mandrel in rear of said folding means for lapping over upon the mandrel one edge of the strip, a roll in rear of said device provided with a peripheral portion for lapping over the other edge of the strip, mechanism for operating said roll and feed wheel, mechanism for operating the scoring means, and a connection between the said operating mechanisms.

5. In a box machine, the combination with a mandrel, of means coöperating with the mandrel for feeding a strip of paper therealong, means for scoring the paper prior to its delivery to the mandrel, a support arranged beneath the mandrel and having one of its ends projecting to a point between the mandrel and said scoring means, means for folding the paper around three sides of the mandrel, and means for subsequently causing the edges of the strip so folded to overlap and adhere, said last-named means including a roll provided with a peripheral portion for engaging and folding over one edge of the strip, and means for driving said roll.

6. In a box machine, the combination with a mandrel, of means coöperating with the mandrel for feeding a strip of paper therealong, means for scoring the paper prior to its delivery to the mandrel, a support arranged beneath the mandrel and having one of its ends projecting to a point between the mandrel and said scoring means, a pair of rolls arranged at opposite sides of the mandrel for folding a strip of paper around three sides of the mandrel and means for subsequently causing the edges of the strip so folded to overlap and adhere, said last-named means including a roll provided with a peripheral portion for engaging and folding over one edge of the strip, and means for driving said roll.

7. In a box machine, the combination with a mandrel, of means coöperating with the mandrel for feeding a strip of paper therealong, means for folding the paper around three sides of the mandrel, a blade overhanging and coöperating with the top of the mandrel in rear of said folding means for folding one of the strip edges upon the mandrel, a roll arranged at the opposite side of the mandrel provided with a peripheral portion for folding the other strip edge upon that folded by said blade, and means for driving said roll.

8. In a box machine, the combination with a mandrel, of means coöperating with the mandrel for feeding a strip of paper therealong, means for folding the paper around three sides of the mandrel, a blade overhanging and coöperating with the top of the mandrel in rear of said folding means for folding one of the strip edges upon the mandrel, a roll arranged at the opposite side of the mandrel provided with a peripheral portion for folding the other strip edge upon that folded by said blade, said folding blade being arranged in advance of the folding roll, whereby the strip edges are folded in succession, and means for driving said roll.

9. In a box machine, the combination with a mandrel of rectangular form in cross section, and means coöperating with the mandrel for feeding a strip of paper therealong, of inclined rolls arranged at opposite sides of the mandrel for folding the paper around three sides of the mandrel, a blade overhanging and coöperating with the top of the mandrel in rear of said rolls to fold one of the strip edges upon the mandrel, a roll arranged at the opposite side of the mandrel provided with a peripheral portion for folding the other strip edge upon that folded by said plate, and means for driving said roll.

10. In a box machine, the combination with a mandrel, and means coöperating with the mandrel for feeding a strip of paper therealong, of means for folding the strip of paper around three sides of the mandrel, a device overhanging and coöperating with the top of said mandrel for folding over one edge of said strip, said device being arranged in rear of said folding means, a pair of pressing rolls arranged in rear of said device, one of said rolls having a flange to fold over the other edge of the strip, and means for driving said pressing rolls.

11. In a box machine, the combination with a mandrel, and means coöperating with the mandrel for feeding a strip of paper therealong, of means for folding the strip of paper around three sides of the mandrel, a fixed blade overhanging and coöperating with the top of said mandrel for folding over one edge of said strip, said blade being arranged in rear of said folding means, a pair of pressing rolls arranged in rear of said blade, one of said rolls having a flange to fold over the other edge of the strip, and means for driving said pressing rolls.

12. In a box machine, the combination with a mandrel, and means coöperating with the mandrel for feeding a strip of paper therealong, of means for scoring the strip of paper, means for folding said strip around three sides of the mandrel, a fixed blade overhanging and coöperating with the top of said mandrel for folding over one edge of said strip, said blade being arranged in rear of said folding means, a pair of pressing rolls arranged in rear of said blade, one of said rolls having a flange to fold over the other edge of the strip, and means for driving said pressing rolls.

13. In a box machine, the combination with a mandrel, of a device for applying glue to a strip of paper, means for scoring said paper, a paper support beneath the mandrel, a pair of inclined rolls arranged at opposite sides of the mandrel for folding the paper around three sides of the mandrel, a device overhanging and coöperating with the top of the mandrel in rear of said rolls to fold one of the strip edges upon the mandrel, a feed wheel below the mandrel coöperating with the latter to feed the paper therealong, and a pair of pressing rolls on opposite sides of the mandrel and in rear of said device, the roll on the side of the mandrel opposite to said device having a flange to fold over the other edge of the strip.

14. In a box machine, the combination of a mandrel, a device for applying glue to a strip of paper, scoring means, a paper support beneath the mandrel, a pair of inclined rolls on opposite sides of the mandrel, a fixed edge-folding blade over the mandrel, a feed wheel below the mandrel, a pair of pressing rolls on opposite sides of the mandrel, one of which has flanges above and below the mandrel, mechanism for operating said pressing rolls and feed wheel, mechanism for operating the scoring means, and a connection between the said operating mechanisms.

15. In a box machine, the combination of a mandrel, a device for applying glue to a strip of paper, scoring means, a paper support beneath the mandrel, a pair of inclined rolls on opposite sides of the mandrel, a fixed edge-folding plate over the mandrel, a feed wheel below the mandrel, a pair of pressing rolls on opposite sides of the mandrel, one of which has flanges above and below the mandrel, a pawl and ratchet mechanism for operating said pressing rolls and feed wheel, a like mechanism for operating the scoring means, and a connection between the two pawl and ratchet mechanisms.

16. In a box machine, the combination with an elongated bar rectangular in cross section and constituting a mandrel, of means for feeding stock in a direction longitudinally of the mandrel, means for folding the stock around three sides of the mandrel, a device overhanging and coöperating with the top of the mandrel and in rear of said folding means to fold one of the strip edges upon the mandrel, a roll arranged at the opposite side of the mandrel provided with a peripheral portion for folding the other strip edge upon that folded by said device, means for actuating said roll, and means for cutting the completely folded stock while on the mandrel, whereby open tubes having the cross-sectional form of the mandrel are delivered therefrom.

17. In a box machine, the combination with a mandrel, of a pair of tube-cutting knives arranged at opposite sides thereof and having their inner ends provided with cutting edges formed to embrace the mandrel when cutting the tube, each of said knives being movable independently of the other across the mandrel to cause the cutting edges thereof to engage the tube, and means for operating said knives.

18. In a box machine, the combination with a mandrel rectangular in cross section, means for feeding a strip of paper therealong, and means for folding the strip thereon in tube-form, of a pair of oppositely-acting tube-cutting knives arranged at opposite sides of the mandrel, the inner end of each of said knives being recessed to embrace the mandrel and provided with cutting edges, whereby each of said knives is adapted to cut the tube on a plurality of its sides, each of said knives being movable independently of the other across the mandrel to cause the cutting edges thereof to engage the tube, and means for operating said knives.

19. In a box machine, the combination with a mandrel rectangular in cross section, of a pair of oppositely-acting tube-cutting knives arranged at opposite sides of the mandrel, the inner end of each of said knives being recessed to embrace the mandrel and provided with a substantially vertical cutting edge and substantially horizontal cutting edges at the ends of the vertical cutting edge, and means for operating said knives.

20. In a box machine, the combination with a mandrel, of a pair of tube-cutting knives arranged at opposite sides thereof and having their inner ends provided with cutting edges formed to embrace the mandrel when cutting the tube, each of said knives being movable independently of the other across the mandrel to cause the cutting edges thereof engaging the tube, and means for moving one knife in advance of the other.

21. In a box machine, the combination with a mandrel, of a cutting device associated therewith and comprising two members arranged at opposite sides of the mandrel, each of said members comprising a guide, a slide arranged therein and movable toward and away from the mandrel, said slide having cutting edges at its inner end formed to embrace the mandrel when cutting the stock upon the mandrel, means for maintaining the slides in working relation to the guides, and means for operating said slide.

22. In a box machine, the combination with a mandrel, of a cutting device associated therewith and comprising two members arranged at opposite sides of the mandrel, each of said members comprising a guide, a slide arranged therein and movable toward and away from the mandrel, said slide having cutting edges at its inner end formed to embrace the mandrel when cutting the stock upon the mandrel, springs for maintaining the slides in working relation to the guides, and means for operating said slides.

23. In a box machine, the combination with a mandrel, of a cutting device associated therewith and comprising two members arranged at opposite sides of the mandrel, each of said members comprising a guide, a slide arranged therein and movable toward and away from the mandrel, said slide having cutting edges at its inner end formed to embrace the mandrel when cutting the stock upon the mandrel, rods connected to said slides, springs connected to said rods and exerting their tension to maintain said slides in working relation to the guides, and means for operating said slides.

In testimony that we claim the foregoing we have hereunto set our hands this 27th day of Dec., 1899.

CHARLES HENRY PALMER.
JOHN WILLIAM DENMEAD.

Witnesses:
  TOM F. PALMER,
  B. C. ROSS.

---

Copies of this patent may be obtained for five cents each, by addressing the "Commissioner of Patents, Washington, D. C."